(12) United States Patent
Moore

(10) Patent No.: US 8,152,995 B2
(45) Date of Patent: *Apr. 10, 2012

(54) ARRANGEMENTS TO REDUCE HARDNESS OF WATER IN A HOT WATER SYSTEM

(76) Inventor: Steven Clay Moore, Austin, TX (US)

( * ) Notice: Subject to any disclaimer, the term of this patent is extended or adjusted under 35 U.S.C. 154(b) by 635 days.

This patent is subject to a terminal disclaimer.

(21) Appl. No.: 12/138,406

(22) Filed: Jun. 12, 2008

(65) Prior Publication Data

US 2008/0237138 A1   Oct. 2, 2008

Related U.S. Application Data

(63) Continuation-in-part of application No. 11/251,027, filed on Oct. 14, 2005, now Pat. No. 7,387,721.

(51) Int. Cl.
*C02F 1/02* (2006.01)

(52) U.S. Cl. ...... 210/95; 122/13.01; 122/14.1; 122/19.1; 210/96.1; 210/138; 210/143; 210/167.31; 210/167.32; 210/175; 210/195.1; 210/253

(58) Field of Classification Search .................. 210/175; 126/361.1
See application file for complete search history.

(56) References Cited

U.S. PATENT DOCUMENTS

| | | | |
|---|---|---|---|
| 1,737,202 A | 11/1929 | Runnels | |
| 2,861,689 A | 11/1958 | Lyall | |
| 3,461,854 A | 8/1969 | Toni et al. | |
| 3,606,017 A | 9/1971 | Moore | |
| 3,692,179 A | 9/1972 | Moore | |
| 4,347,133 A | 8/1982 | Brigante | |
| 4,535,931 A | 8/1985 | Bartok et al. | |
| 4,550,710 A | 11/1985 | McDonald, II | |
| 4,606,823 A | 8/1986 | Lucas, III | |
| 4,652,379 A | 3/1987 | Nyberg | |
| 4,790,289 A * | 12/1988 | Barrett | 122/17.1 |
| 4,948,499 A | 8/1990 | Peranio | |
| 4,957,200 A | 9/1990 | Turner et al. | |
| 4,957,624 A | 9/1990 | Peranio | |
| 4,983,193 A | 1/1991 | Tani et al. | |
| 5,017,284 A | 5/1991 | Miler et al. | |
| 5,160,444 A | 11/1992 | McFarland | |
| 5,215,655 A | 6/1993 | Mittermaier | |
| 5,252,206 A * | 10/1993 | Gonzalez | 210/282 |
| 5,254,243 A | 10/1993 | Carr et al. | |
| 5,256,279 A | 10/1993 | Voznick et al. | |
| 5,443,739 A | 8/1995 | Vogel et al. | |
| 5,472,622 A | 12/1995 | Solomon et al. | |
| 5,587,055 A | 12/1996 | Hartman et al. | |
| 5,647,269 A | 7/1997 | Miller et al. | |
| 5,679,243 A | 10/1997 | Cho | |
| 5,753,107 A * | 5/1998 | Magnusson et al. | 210/109 |

(Continued)

*Primary Examiner* — Peter A Hruskoci
(74) *Attorney, Agent, or Firm* — Jeffrey S Schubert; Schubert Law Group PLLC

(57) ABSTRACT

Hot water pipes, in areas with hard water, tend to fill with scale until they no longer pass enough water. De-scaling water pipes with acid is dangerous, expensive and damages the pipes. Ion exchange and reverse osmosis water softeners eliminate scale buildup in pipes, but are expensive. Embodiments of this invention provide a means of keeping an amount of the scale precipitate, created when water is heated, inside a housing by passing the hot water through a removal medium where the scale sticks to the surface. The removal medium can be placed inside the water heater or in a separate housing connected to the water heater; both configurations remove the precipitate from hot water; both save hot water pipes from scale accumulation.

20 Claims, 3 Drawing Sheets

U.S. PATENT DOCUMENTS

| | | |
|---|---|---|
| 5,755,957 A | 5/1998 | Jeon |
| 5,776,333 A | 7/1998 | Plester et al. |
| 5,795,996 A | 8/1998 | Chang et al. |
| 5,837,147 A | 11/1998 | Joung |
| 5,858,248 A | 1/1999 | Plester et al. |
| 6,009,585 A | 1/2000 | Middleton |
| 6,416,673 B2 | 7/2002 | Plester |
| 7,001,524 B2 * | 2/2006 | Moore ............ 210/709 |
| 7,387,721 B2 * | 6/2008 | Moore ............ 210/95 |
| 2004/0238452 A1 * | 12/2004 | Moore ............ 210/702 |

* cited by examiner

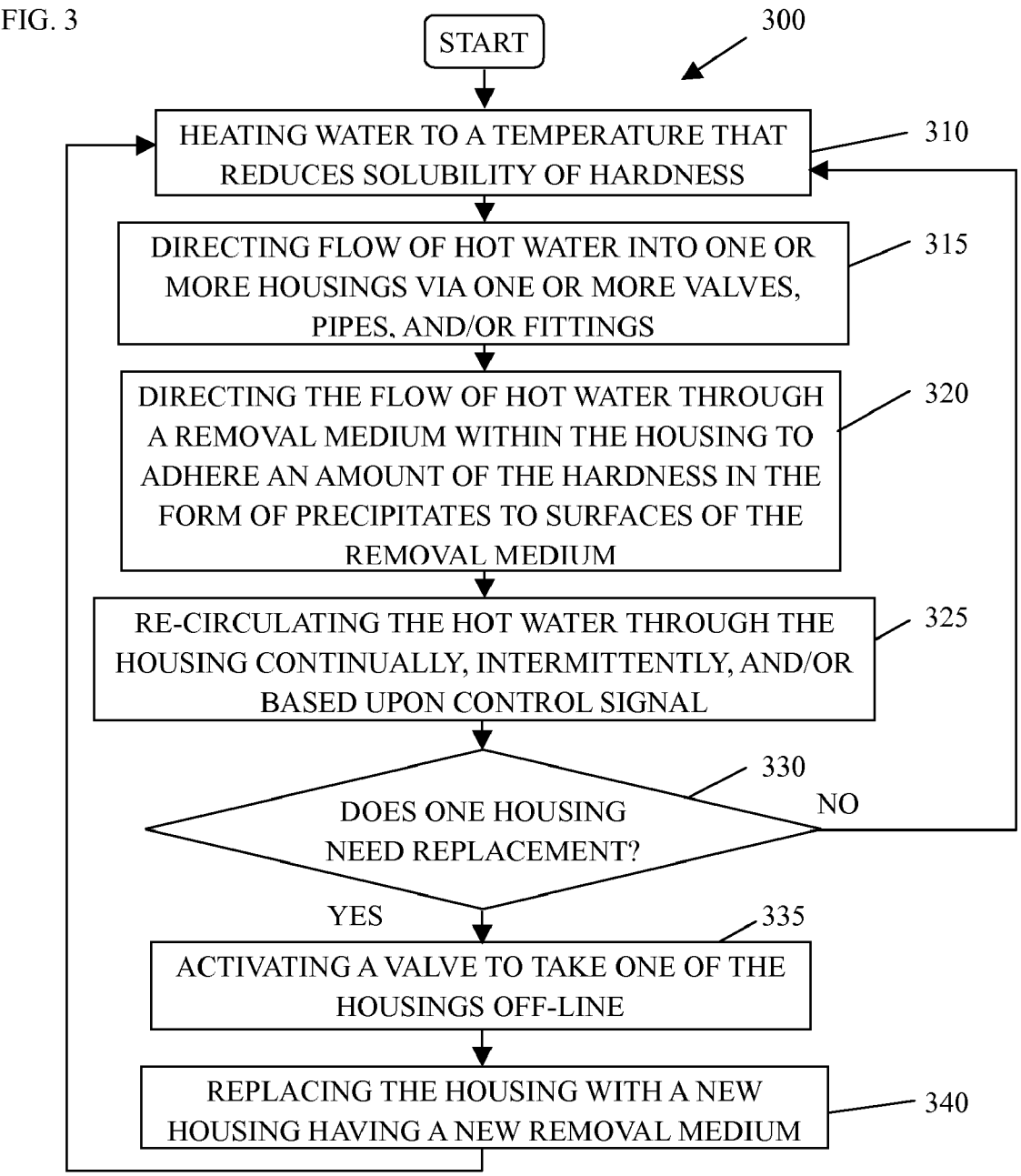

ARRANGEMENTS TO REDUCE HARDNESS OF WATER IN A HOT WATER SYSTEM

CROSS-REFERENCE TO RELATED APPLICATION

This continuation-in-part application claims priority to and benefit of U.S. Utility patent application Ser. No. 11/251,027, filed Oct. 14, 2005, now U.S. Pat. No. 7,387,721, on behalf of inventor Steven Clay Moore, entitled "METHOD FOR REMOVING SCALE CAUSING CHEMICALS IN HOT WATER SYSTEMS".

FIELD

The present invention relates to a water treatment system to remove hardness that causes scale from domestic or commercial hot water.

BACKGROUND

In some places the water supply has so much hardness such as calcium, magnesium, and other dissolved minerals that when the water is heated, solid precipitates form and accumulate as scale inside the water heater and hot water pipes. Scale accumulation inside the water heater typically reduces the life of large tanks, such as tanks used by office buildings and apartment buildings with central hot water systems. Domestically, scale buildup is not as much of a concern; household water heaters and pipes last 10-20 years before scale becomes a problem, even when the water supply is very hard. However, many households still purchase water softeners. In areas where the water supply is hard, apartment complexes with central hot water supplies need to de-scale the hot water pipes about once every 2-6 years, currently costing up to $30,000 depending on the amount of damage to the pipes. Typically, iron pipes can be de-scaled about three times before they must be replaced.

A secondary problem is scale buildup in the water heater. One water heater manufacturer offers a "turbo" model which uses small orifices on the input pipe to create turbulence inside the tank. The concept is to flush out scale buildup with the turbulence. Unfortunately, it is cheaper to keep the scale in the water heater; a commercial size domestic water heater costs about $4,000 (including labor) to replace, while de-scaling the pipes is much more expensive.

Current water treatment methods are too effective and therefore too costly for applications where the objective is reducing scale buildup in the water heater and hot water pipes. Ion exchange water softening systems, such as supplied by Culligan, are both expensive to install and costly to maintain. These systems require regular maintenance and when used to treat large quantities of water the upkeep makes them economically unfeasible. Also, ion exchange systems pollute the sewer with brine. The following discussion regarding ion exchange water softening systems is substantially based upon a discussion published by Culligan:

Ion exchange water softening systems normally address only bicarbonate hardness or, if more complicated, the total metal and salt content of water. However, these systems need regular maintenance such as the regeneration of the ion-exchange resin. If such maintenance is not carried out, these systems can actually produce treated water of worse quality than untreated water. Chlorine can damage the ion-exchange resins in these systems. Moreover, microbiological contaminants may be significantly increased due to microbiological growth on the resin if chlorine-free water is being treated.

Calcium and magnesium ions can combine with other ions and compounds to leave a hard scale on the surfaces they touch so ion exchange water softening systems reduce hardness problems by exchanging calcium and magnesium ions with sodium ions. Sodium ions are considered "soft" ions because sodium ions normally remain dissolved in the water and do not precipitate to form a hard buildup like scale.

A typical water softener has a pressure tank partially filled with ion exchange resin. For example, Culligan's brand of resin, Cullex® resin, consists of highly porous, amber colored, plastic beads loaded with "exchange sites" that remove hardness ions and replace them with sodium ions. A softener system also includes a brine tank to provide a source of sodium ions (salt) for regenerating the resin and hydraulic controls to direct the flow of water through the softener during service and regeneration.

At the beginning of the softening cycle, sodium ions occupy the resin's exchange sites. As water passes through it, the resin's stronger attraction for the hardness ions causes it to take on the hardness ions and give up its sodium ions. Iron and manganese are considered hardness and they are removed also, provided they are in solution. Ion exchange cannot remove suspended matter.

As water flows downward through the resin bed, the resin at the top of the bed gives up its sodium first. The exchange process is not instantaneous, so exchange occurs in a band called a "reaction zone". The reaction zone's depth depends on incoming water hardness and total dissolved solids (TDS), flow rate, water temperature and resin particle size. When the reaction zone's leading edge reaches the bottom of the resin bed hardness is passed into the service line, the resin has become "exhausted" and it must be regenerated before it can remove hardness again.

The regeneration cycle starts with backwash, an upward flow that loosens the resin bed and flushes out suspended particles. Backwash may last about 10 minutes. Regeneration occurs when a solution of sodium chloride (salt) brine is passed through the resin in a downward direction. An educator draws concentrated brine from a storage tank and dilutes it to the right concentration. Brine draws lasts from 10 to 30 minutes depending on salt dosage (weight of salt per volume of resin). A large excess of sodium ions causes the resin to release its hold on hardness ions picked up during the preceding service cycle and returns the resin to its sodium state.

The brining step is followed by a slow downflow rinse to displace spent brine from the resin. It also carries the hardness removed from the resin to drain. The rinse rate is regulated to ensure correct contact time between the salt and the resin. Slow rinse usually lasts about 30 minutes.

A final fast downflow rinse, or purge, flushes all remaining brine from the tank. It lasts about 5 minutes.

Each cubic foot of Cullex® resin can remove about 30,000 grains of hardness when dosed with 15 pounds of salt (one liter of resin can remove 69 grams of hardness when regenerated with 240 grams of salt). A lower dosage of 6 pounds per cubic foot yields about 20,000 grains of capacity (46 grams capacity at 96 grams of salt per liter). This lower dosage is more salt efficient, but it requires more frequent regeneration. Most softeners are selected on the basis of a balance between capital cost and operating cost.

Another treatment technique is reverse osmosis. Reverse osmosis systems can treat large quantities of water, as in semiconductor factories, and purify water through a reverse osmotic membrane. In addition to filtering out the carbonates that cause scale, these systems also remove heavy metals and biological contaminants. Reverse osmosis systems are more expensive than ion exchange systems and are directed towards improving water quality rather than only removing the chemicals that become scale. Reverse osmosis systems require significant maintenance. Moreover, volatile organic compounds (VOC) and trihalomethanes (THMs) are not treated and these together with chlorine, can actually damage the reverse osmotic membrane and reduce its effectiveness.

Reverse osmosis (RO) is a separation process that uses pressure to force a solution through a membrane that retains the solute on one side and allows the pure solvent to pass to the other side. More formally, it is the process of forcing a solvent from a region of high solute concentration through a membrane to a region of low solute concentration by applying a pressure in excess of the osmotic pressure. This is the reverse of the normal osmosis process, which is the natural movement of solvent from an area of low solute concentration, through a membrane, to an area of high solute concentration when no external pressure is applied. The membrane here is semi-permeable, meaning it allows the passage of solvent but not of solute.

The membranes used for reverse osmosis have a dense barrier layer in the polymer matrix where most separation occurs. In most cases the membrane is designed to allow only water to pass through this dense layer while preventing the passage of solutes (such as salt ions). This process requires that a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure which must be overcome.

Both ion exchange and reverse osmosis systems remove scale, but at a cost where it is cheaper for office buildings and apartment complexes to de-scale and replace hot water pipes than purchase and maintain a water softener.

SUMMARY

It is specifically because the precipitates adhere together to form a solid that they are a problem and cause scale. Thus, all that is necessary to remove the precipitates is giving them ample opportunity to adhere somewhere harmless before traveling down the hot water pipes. For low volume applications, such as soft drink dispensers, a filter would work, but it will clog in a domestic or commercial hot water application. Embodiments of the present invention provide adequate scale removal for domestic or commercial hot water applications by spreading the water flow over a large surface area of a removal medium, allowing the water to pass slowly through many small passages where there is ample time for the precipitate particles to come into contact and adhere to a surface. As a result of the large number of passageways, there is minimal flow restriction.

Additionally, as scale accumulates on the surfaces, some embodiments provide a means for surface areas of the removal medium to accommodate the scale buildup without further restricting flow. Some embodiments comprise a removal medium with a large surface area such as a pile of rock, gravel, sand, and/or man made media such as glass, metal, plastics, alloys, resins, and/or any other man made material to which hardness precipitates will adhere. Such a removal medium can have enough open space to accommodate a significant amount of scale accumulation before restricting flow. Further embodiments may loosely hold granules of the removal medium in place with a loose mesh, such as spun glass. In many embodiments, the removal medium is loosely held so that as scale accumulates on the surfaces of the removal medium, the flowing water can push loose granules of the removal medium and increase their separation as gaps between granules fill with scale buildup. This allows the removal medium flexibility to expand as scale builds up on the surfaces to accommodate additional deposits of precipitates from the water.

Embodiments of the present invention involve placement of a removal medium such as granules or other materials as a layer inside a water heater tank, and/or in one or more separate housings, to pass hot water through the removal medium. Providing a place inside the water heater tank for the removal medium would be part of the manufacturing process of the water heater. The separate housing configuration has the advantage of being less costly to replace or rejuvenate. In some embodiments, the separate housing is a disposable unit that is replaced by a new housing with a new removal medium once the removal medium in the separate housing is substantially unable to accumulate scale.

Several embodiments comprise a circulation pump. The circulation pump may pump or force water through the removal medium. In some embodiments, the circulation pump may re-circulate water through the removal medium multiple times to remove more hardness from the water. In many embodiments, the circulation pump may re-circulate the water through the removal medium a predetermined number of times or until a predetermined hardness is attained by monitoring the hardness of the water via a hardness meter.

Embodiments of the present invention work with water heaters that do not use tanks as well as water heaters that use tanks. However, most domestic hot water applications use tank water heaters because they store a reserve of heated water to meet the demand during morning and evening hours. As a result, embodiments of this invention re-circulate, by means of a circulation pump, the water up to, e.g., 1,000 times through the removal medium during off peak times or during times otherwise determined to be at low demand for hot water.

BRIEF DESCRIPTION OF THE DRAWINGS

FIG. 3 shows a flowchart of an embodiment for reducing hardness in water.

DETAILED DESCRIPTION OF EMBODIMENTS

Figure 1:
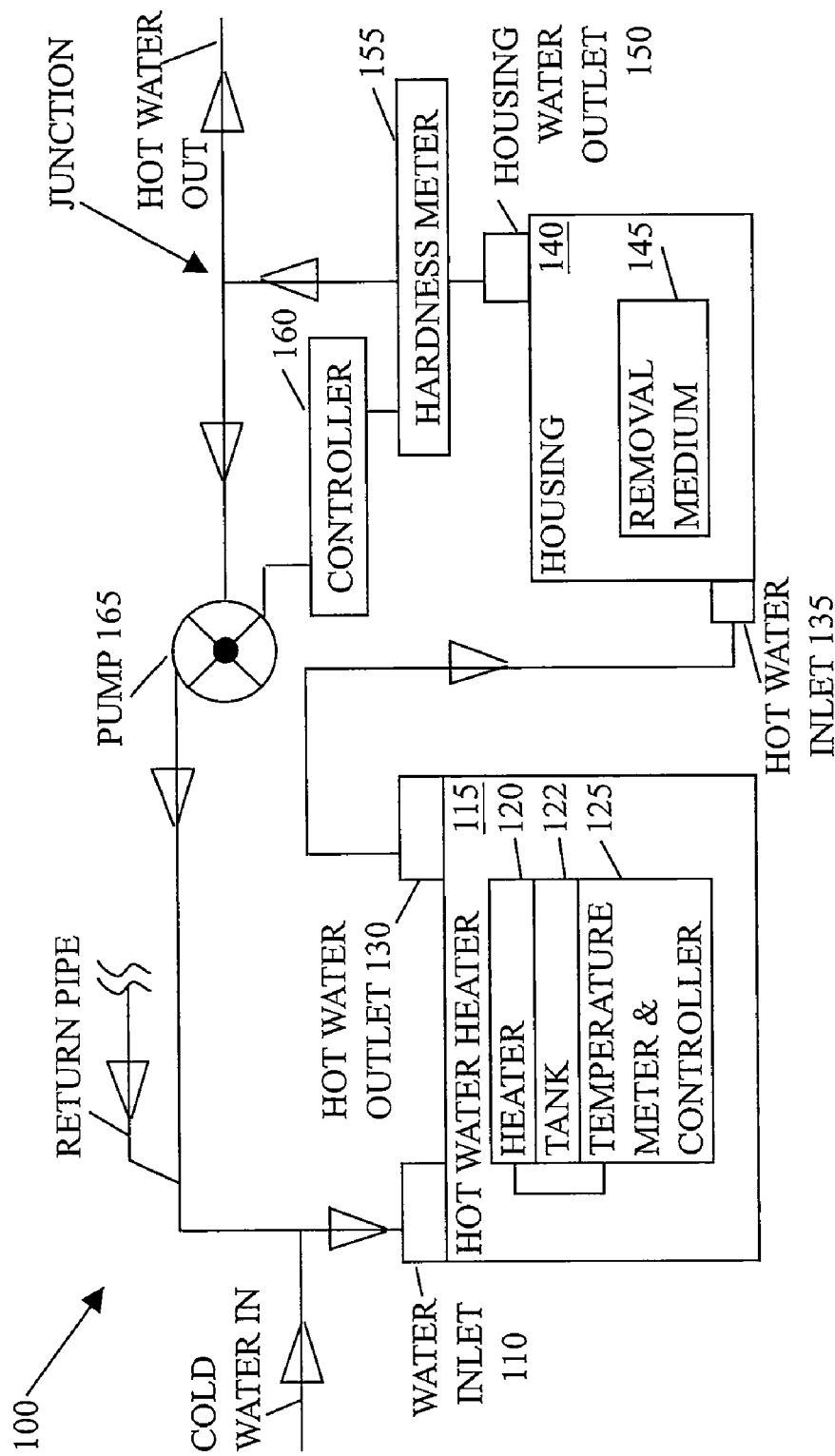
FIG. 1 shows an embodiment of a system for reducing hardness in water comprising a pump, hardness meter, and a controller for controlling the pump.

The following is a detailed description of example embodiments of the invention depicted in the accompanying drawings. The example embodiments are in such detail as to clearly communicate the invention. However, the amount of detail offered is not intended to limit the anticipated variation of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, apparatuses, and media for reducing hardness of water in hot water systems are disclosed. Embodiments comprise a hot water heater with or without a tank and a housing that attaches to the hot water heater to receive and treat hot water prior to distribution of the hot water. Embodiments provide a relatively inexpensive way to reduce the hardness of water by encouraging the hardness to precipitate and adhere to the removal medium. Heating the water can cause the hardness to precipitate and passing the water across large surface areas of the removal medium encourages the precipitates to adhere to the removal medium. Unlike reverse osmosis systems, adherence of the precipitates to the removal medium does not involve osmosis through a membrane. And, unlike ion exchange water softening systems, hot water treated by embodiments of this invention can continue to deposit precipitates on the removal medium until water can no longer flow over the surfaces of the removal medium. In other words, the removal medium does not need regeneration via, e.g., brine, and adherence of precipitates to removal media of embodiments is not limited by ions available to exchange or depletion of active ions in the removal media. The limitation on the amount of precipitates that removal media of embodiments can receive is based upon the amount of scale buildup it takes to block the paths for the hot water on, through, and over the removal medium. Some embodiments may include a system to sense when the removal medium is becoming clogged or blocked such as a flow meter, a pressure sensor, or a filter that clogs prior to the paths of removal medium becoming blocked. Further systems may determine whether the scale buildup exceeds a designated volume capacity. Also, unlike ion exchange systems, which remove dissolved ions but not solids, many embodiments do not remove dissolved ions in any significant amounts but do remove solids.

The removal medium provides a large surface area for deposition of precipitates from the hot water. If the housing within which the removal medium resides is intended to be reused, the surface area of the removal medium is significantly larger than the interior surface of the housing to minimize deposits on the housing. In further embodiments, the interior surface of the housing may be treated to attenuate deposition of precipitates, comprise a disposable liner, or the like to reduce or eliminate scale build-up on the interior surface of the housing. The surface area of the removal medium continues to adhere to precipitates even after the surface area is thoroughly coated with scale because the precipitates will adhere to scale.

The removal medium may comprise any medium upon which precipitates will adhere such as a bed of granules or loose mesh material, such as spun glass, sand, or even pieces of scale. For example, after accumulating scale on a removal medium, the removal medium can be reused by crushing or otherwise breaking the removal medium and/or scale into smaller pieces and placing some of the smaller pieces back into the housing. In many embodiments, only pieces large enough to be held in the housing or otherwise prevented from leaving the housing may be used as the removal medium or a portion thereof. In some embodiments, the crushed scale is mixed with other materials to form the removal medium.

In some embodiments, loose granules and/or mesh materials offer the flexibility for paths or passages on, over, or through the removal medium to enlarge in response to water pressure and water flow after scale builds up on the removal medium. The granules can be rock, sand, metal, plastic, glass, gravel, resins, scale, or other material. In many embodiments, the height of the bed of granules or loose mesh material is also variable, the only restrictions being the amount of space in the housing where the removal medium is stored and how much scale the bed can accumulate before significantly restricting flow. A bed of granules can be held in place by screens, perforated plates or plates made of any material. In other embodiments, the bed of granules may be held in place or substantially in place by their own weight. The bed of granules may be held within the housing by screens, perforated plates or plates made of any material, or may be held within the housing by the size of the granules.

In several embodiments, whether inside a water heater or housed in a separate housing, the housing holding the removal medium comprises an opening to load, remove, or replace granules or loose mesh material. In other embodiments, the housing within which the removal medium is held is disposable and is replaced by a new housing with removal medium.

Embodiments may also comprise housings with windows or portals allowing inspection of the granules or loose mesh material without opening the housings. The surrounding pipes may also have a port to monitor scale buildup while the system is running. Embodiments may also include a means to stir, mix, shake, or otherwise agitate the removal medium continuously, periodically, and/or in response to user input or a control signal.

Turning to the drawings, FIG. 1 depicts one embodiment of a system 100 to reduce hardness in water comprising a water heater 115, a housing 140, an optional hardness meter 155, a controller 160, and a pump 165. The cold water (Cold Water In) joins the circulated hot water exiting pump and enters water heater 115 at water inlet 110. The water is then heated with heater 120 to a temperature set and sensed by temperature meter and controller 125. A tank 122 stores hot water and the hot water exits hot water heater 115 at hot water outlet 130. The hot water is fed into housing 140 at the bottom of housing 140 via hot water inlet 135. Housing 140 comprises a removal medium 145 to accumulate hardness precipitates from the hot water.

Within housing 140, the water spreads over a bed of granules and loose mesh material comprising removal medium 145. The flow of hot water passes through paths or passages, on, and over removal medium 145, depositing the precipitates on removal medium 145. The treated hot water exits housing 140 at the top of housing 140 via housing water outlet 150 and is then split at a junction where one pipe supplies the hot water pipes (Hot Water Out) and the other is fed back into the water heater 115 by means of a circulation pump 165.

In many embodiments, a conductivity meter, or other hardness meter such as hardness meter 155 may monitor water hardness and the effectiveness of the removal medium in removing the precipitates that cause scale. Embodiments may accomplish this by connecting one or more hardness meters, after or before and after the system, indicating the amount of precipitate removal. Hardness meter 155 determines or monitors the hardness of water flowing from housing water outlet 150 and outputs an indication of the hardness to controller 160. In other embodiments, the hardness meter 155 may be located at a different location within system 100 such as at Hot Water Out, after the junction and prior to entering pump 165, after pump 165 and prior to Cold Water In, or after Cold Water In but prior to water inlet 110.

Based upon the indication from hardness meter 155 and predetermined settings related to the hardness of the water, controller 160 may determine whether pump 165 is on or off and, in some embodiments, the strength at which pump 165 operates. The predetermined settings and/or calculations performed by controller 160 may be based upon the location of hardness meter 150 and, in some embodiments, the configuration of system 100. For instance, controller 160 may re-circulate water through water heater 115 and housing 140 multiple times during off-peak times and/or while demand is low. In further embodiments, controller 165 may shut off pump 165 during peak times and/or times at which demand for hot water is high. In some of these embodiments, controller 160 may receive indications related to water pressure at Hot Water Out and/or other information to make such determinations.

The present embodiment also comprises a return pipe to maintain hot water throughout the hot water system, which provides recirculation of hot water through the scale removal medium.

Figure 2:
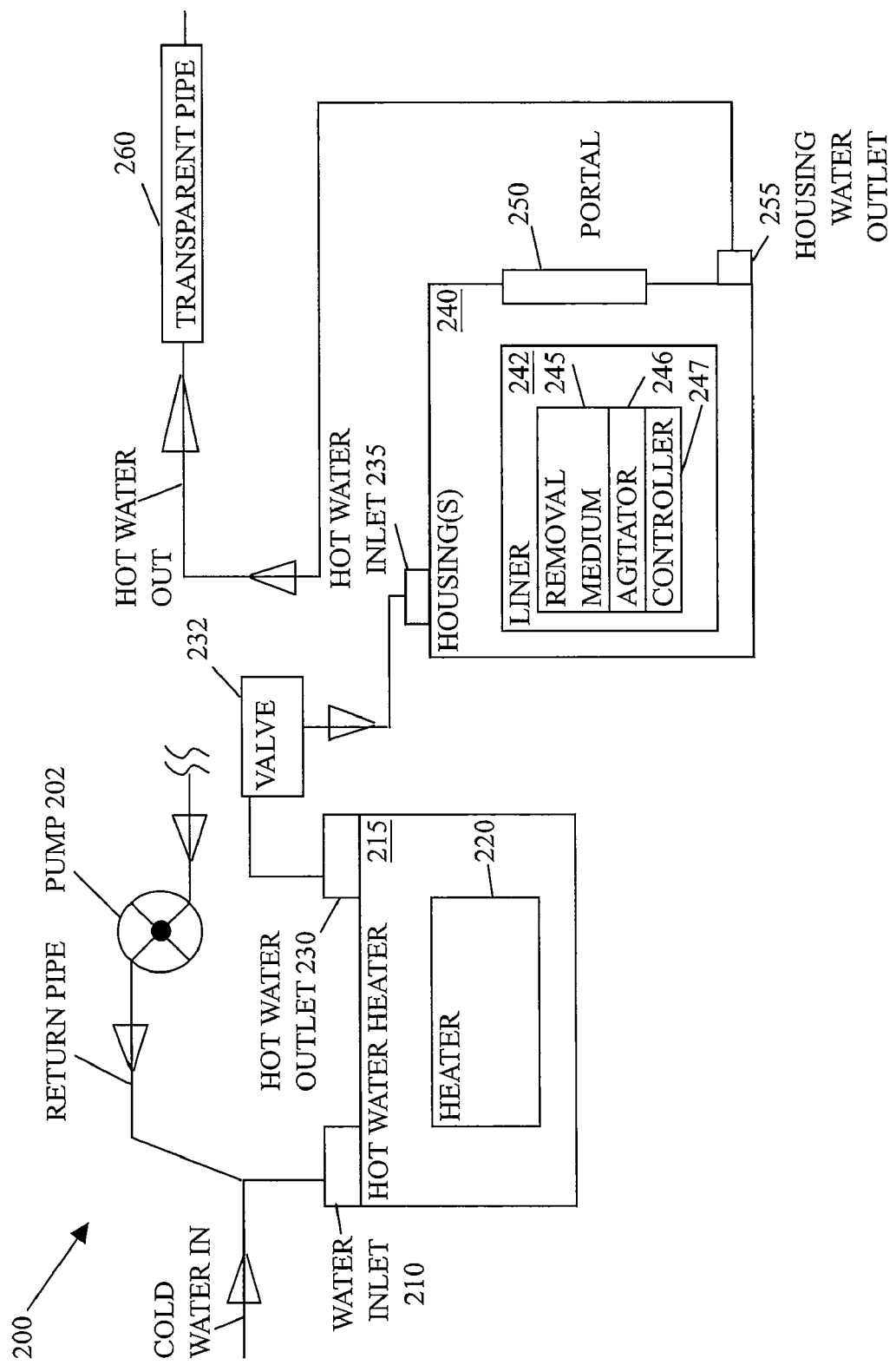
FIG. 2 shows another embodiment of a system for reducing hardness in water comprising a valve, one or more housings, and a transparent pipe.

FIG. 2 shows another embodiment of a system 200 for reducing hardness in water comprising a hot water heater 215, a valve 232, one or more housings 240, and a transparent pipe 260. The cold water (Cold Water In) enters water heater 215 at water inlet 210. The water is then heated with heater 220. Alternative embodiments may comprise a tank such as tank 122 in FIG. 1.

The present embodiment comprises a pump 202 to circulate the hot water through the distribution system and hot water heater 215 via the return pipe. Pumping the hot water through the hot water distribution system keeps the hot water hot even during periods of low usage. Pump 202 may operate continuously, intermittently, or may even be programmed to operate at certain times during the day or during periods of low usage. In some embodiments, a motor controller for pump 202 may be programmable to adjust the scheduled operation of pump 202 based upon the season or month of the year. Re-circulating the hot water through removal medium 245 of housing(s) 240 removes additional hardness from the hot water. Other embodiments may include more than one pumps such as pump 165 from FIG. 1 and pump 202.

The hot water exits hot water heater 215 at hot water outlet 230 and is fed into the top of housing(s) 240 via valve 232 at hot water inlet 235. Housing(s) 240 comprise a removal medium 245. Valves such as valve 232 may be placed at various locations to facilitate replacement of removal medium 245, heater 220, and/or housing(s) 240 by, e.g., isolating the appropriate sections.

Housing(s) 240 may comprise one or more housings connected in series (cascaded housings), one or more housings connected in parallel, or one or more individual or cascaded housings connected in parallel. Within housing(s) 240, the water flows through, on, and over surface areas of removal medium 245, wherein precipitates adhere to surface areas of removal medium 245. Removal medium 245 may reside within a disposable liner 242 in housing(s) 240, which resides between the interior surface of housing(s) 240 and removal medium 242 to reduce or eliminate scale build-up on the interior surface of housing(s) 240.

An agitator 246 may couple with the housing to stir, mix, shake, or otherwise agitate removal medium 245 continuously, periodically, and/or in response to user input or a control signal. And a controller 247 may couple with agitator 246 to initiate or terminate agitation based upon a predetermined schedule, a programmed schedule and/or a schedule indicated via user input or the control signal. For example, in some embodiments, controller 247 may be programmed or otherwise set by a user to continuously or periodically agitate removal medium 245. In one such embodiment, the user may select days and/or times to agitate removal medium periodically and/or may select time intervals between agitation cycles. Agitation, while not necessary, can improve the life and effectiveness of removal medium 245, particularly when hot water runs downward through removal medium 245. Agitation can break up a solid scale layer that might form on top of removal medium 245.

In further embodiments, agitation cycles may employ more than one type of agitation. For instance, controller 247 may control multiple types of agitation such as stirring, mixing, shaking, and the like and controller 247 may offer programming each of or combinations of the different types of agitation at intervals or on specific days and/or times.

To further illustrate, controller 247 may be programmed or otherwise set to stir removal medium 245 continuously one day and shake removal medium 245 continuously the next day. Controller 245 may alternatively, be programmed to stir removal medium 245 every third agitation cycle, mix removal medium 245 for one third of the agitation cycles, and shake removal medium 245 for one third of the agitations cycles.

Controller 247 may comprise electrical and/or mechanical components to be programmed or otherwise set to implement user programmable agitation cycles. In some embodiments, controller 247 comprises logic such as hardware or software. Many embodiments comprise a combination of hardware and software. In one such embodiment, such software may be maintained on a non-volatile storage medium such as flash memory.

Housing(s) 240 may each comprise a portal 250. Portal 250 may be substantially transparent so the scale buildup on the removal medium may be viewed or otherwise assessed without opening housing(s) 240. In such embodiments, liner 242 may be transparent.

The treated water exits housing(s) 240 at housing water outlet 255 to supply the hot water pipes (Hot Water Out). The treated water enters transparent pipe 260 so the scale buildup on the removal medium may be viewed or otherwise assessed without opening the pipes. In other embodiments, only a portion of a pipe may be transparent or a junction with a viewing port may be installed at or near Hot Water Out.

In further embodiments, multiple housings, water heaters, pumps and insulated pipes and valves may augment the above systems. Embodiment may also include valves before and after pumps, pipes and tanks to switch between in-use and offline units. In several embodiments, valves may be located before and after some or all pumps, pipes and tanks as appropriate for maintenance and replacement. In some embodiments, the off-line units may be backups or units to be replaced or serviced.

FIG. 3 shows a flowchart 300 of an embodiment for reducing hardness in water. Flowchart 300 begins with heating water to a temperature that reduces solubility of hardness (element 310). A water heater should heat the incoming cold water to between 50 and 110 degrees Celsius. The solubility of hardness such as calcium carbonate is inversely proportional to temperature; at higher temperatures more of it is in precipitate form and more of it will adhere to the surface areas of the removal medium.

Pipes, valves, and/or fittings direct the flow of hot water into one or more housings (element 315). Then, the housing directs the flow of hot water through a removal medium within the housing to adhere an amount of the hardness in the form of precipitates to surfaces of the removal medium (element 320). In some embodiments, housings may be cascaded and/or in parallel to increase the amount of precipitates removed and increase the flow rate of water through the removal medium. In further embodiments, housings may be in parallel so one or more housings may be off-line or taken off-line without disrupting the flow of hot water from a Hot Water Out of a system such as system 100 in FIG. 1 or system 200 in FIG. 2. Taking a housing off-line may facilitate maintenance or replacement of the housing and/or removal medium.

Once the flow of hot water passes through the housing(s), one or more pumps may re-circulate the hot water through the housings continually, intermittently, and/or based upon a control signal (element 325). For instance, a controller such as controller 160 may re-circulate water exiting from the housings back through the housings to increase the amount of hardness removed from the water. In many embodiments, the water exiting the housings is directed through the hot water heater again to maintain the temperature of the water within a desired range of temperatures to reduce the solubility of hardness in the water such as iron, manganese, and calcium. Hot water systems where the heater is sufficiently distant from the user(s) may have a recirculation system (a return pipe and a "recirculation pump") to maintain hot water throughout the hot water system. The systems described in FIGS. 1 and 2 may be used with such a system; in which case the pump such as pump is often referred to as a "recirculation pump". Such a recirculation pump also provides recirculation of hot water through the scale removal medium.

Some embodiments may include a system to sense when the removal medium is becoming clogged or blocked such as a flow meter, a pressure sensor, or a filter that clogs prior to the paths of removal medium becoming blocked. If paths through and over surface areas of the medium, become clogged, for instance, a flow meter may output a signal indicating that the removal medium, or housing if the housing is disposable, should be replaced. If the removal medium or housing should be replaced (element 330), a controller may activate a valve to take the housing off-line (element 335). The housing is then designated as off-line and may then be replaced with a new housing with a new removal medium (element 340). In some embodiments, another housing may be brought on-line and designated as on-line at or around the same time to reduce the impact of taking the first housing off-line. Otherwise or thereafter, the system may continue to heat water and pass the water through the housing(s) to reduce hardness of the water.

In other embodiments, the removal medium may be removed from the housing and replaced with a new removal medium. In some of these embodiments, the new removal medium may comprise, at least in part, small pieces of scale. For instance, the "spent" removal medium may be removed because the scale build-up has restricted the water flow too significantly. The spent removal medium may be crushed or otherwise broken and pieces of the removal medium, including pieces of scale, large enough to be retained in the housing may be placed back into the housing as the new removal medium. Remaining pieces of scale and/or removal medium that is large enough to be retained in the housing may be saved for later use or used as removal medium in another housing.

Another embodiment of the invention is implemented as a program product for use with a storage device to reduce hardness in water, in accordance with, e.g., systems 100 or 200, or flowchart 300 as shown in FIGS. 1-3. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within the hard drive); and (ii) alterable information stored on writable storage media (e.g., magnetic media of a hard drive). Such data and/or signal-bearing media, when carrying microprocessor-readable instructions that direct the functions of the present invention, represent embodiments of the present invention.

In general, the routines executed to implement the embodiments of the invention, may be part of a storage device operating system or a specific component, program, module, object, or sequence of instructions contained within memory of the storage device. The microprocessor program of the present invention may be comprised of a multitude of instructions that will be translated by the microprocessor into a machine-readable format and hence executable instructions. Also, the programs may be comprised of variables and data structures that either reside locally to the program or are found in memory or other storage devices. In addition, various programs described hereinafter may be identified based upon the application for which they are implemented in a specific embodiment of the invention. However, it should be appreciated that any particular aforementioned program nomenclature is used merely for convenience, and thus the invention should not be limited to use solely in any specific application identified and/or implied by such nomenclature.

One skilled in the art will readily appreciate the flexibility and opportunities that the various embodiments for reducing hardness in water.

It will be apparent to those skilled in the art having the benefit of this disclosure that the present invention contemplates methods, apparatuses, and media to reduce hardness of water. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. An apparatus comprising:
   a hot water heater comprising a water intake and a hot water outlet, and a heater to heat water passing through the hot water heater;
   a housing having a hot water inlet and a housing water outlet, the housing coupled with the hot water heater via the hot water outlet at the hot water inlet;
   a removal medium having a surface area that is larger than the surface area of the interior surface of the housing within which the removal medium resides, wherein the removal medium has a surface area that accommodates adherence of precipitates formed in water and continues to accommodate adherence of precipitates while water flows through the removal medium from the hot water inlet to the housing water outlet until water fails to flow through the removal medium;
   an agitator coupled with the housing to agitate the removal medium; and
   a controller coupled with the agitator to agitate the removal medium at selected time intervals.

2. The apparatus of claim 1, further comprising a disposable liner in the housing between the interior surface of the housing and the removal medium to reduce or eliminate scale build-up on the interior surface of the housing.

3. The apparatus of claim 1, further comprising a meter to monitor hardness of the flow to determine the amount of the precipitate removed from the hot water.

4. The apparatus of claim 1, further comprising a circulation pump to re-circulate the hot water through the removal medium.

5. The apparatus of claim 1, further comprising another housing coupled with the housing in parallel or series.

6. The apparatus of claim 1, further comprising a valve to redirect the flow between the housing and another housing to designate an in-use housing and an offline housing, wherein the in-use housing receives the flow while the flow is blocked from reaching the offline housing.

7. The apparatus of claim 1, wherein the amount of precipitate deposited on the removal medium is not limited by depletion of active ions in the removal medium.

8. The apparatus of claim 1, wherein the removal medium does not regenerate via brine.

9. The apparatus of claim 1, wherein the removal medium is not a significant source of sodium ions.

10. An apparatus comprising:
a hot water heater comprising a water intake and a hot water outlet, and a heater;
a housing having a hot water inlet and a housing water outlet, the housing coupled with the hot water heater via the hot water outlet at the hot water inlet;
a removal medium having a surface area that is larger than the surface area of the interior surface of the housing within which the removal medium resides, wherein the removal medium has a surface area that accommodates adherence of precipitates formed in water and continues to accommodate adherence of precipitates while water continues to flow through the removal medium from the hot water inlet to the housing water outlet with no need for regeneration;
an agitator coupled with the housing to agitate the removal medium; and
a controller coupled with the agitator to agitate the removal medium at selected time intervals.

11. The apparatus of claim 10, wherein housing with the removal medium is a disposable unit.

12. The apparatus of claim 10, wherein housing with the removal medium can be decoupled from the hot water heater and replaced by a new housing with new removal medium.

13. The apparatus of claim 10, wherein the amount of precipitate deposited on the removal medium is not limited by depletion of active ions in the removal medium.

14. The apparatus of claim 10, wherein the removal medium does not regenerate via brine.

15. An apparatus comprising:
a hot water heater comprising a water intake and a hot water outlet, and a heater;
a housing having a hot water inlet and a housing water outlet, the housing coupled with the hot water heater via the hot water outlet at the hot water inlet;
a removal medium having a surface area that is larger than the surface area of the interior surface of the housing within which the removal medium resides, wherein the removal medium has a surface area that accommodates adherence of precipitates formed in water and continues to accommodate adherence of precipitates while water continues to flow through the removal medium from the hot water inlet to the housing water outlet with no need for regeneration;
at least one valve coupled between the hot water outlet and the hot water inlet to redirect water output from the hot water outlet to a second housing, the at least one valve being capable of blocking water from flowing into the hot water inlet of the housing from the hot water outlet of the hot water heater;
an agitator coupled with the housing to agitate the removal medium; and
a controller coupled with the agitator to agitate the removal medium at selected time intervals.

16. The apparatus of claim 15, further comprising an agitator coupled with the housing to agitate the removal medium.

17. The apparatus of claim 15, further comprising a circulation pump to circulate the hot water through the removal medium to adhere a further amount of the precipitate to the removal medium.

18. The apparatus of claim 15, wherein the housing comprises an opening to load, remove and replace the removal medium.

19. The apparatus of claim 15, wherein the housing comprises a viewing port to inspect the precipitate on the removal medium.

20. The apparatus of claim 15, wherein the hot water pipes comprise a transparent portion to inspect for scale accumulation.

* * * * *